United States Patent

[11] 3,589,533

[72] Inventor Roy O. Miller
P.O. Box 423, Benkelman, Nebr. 69021
[21] Appl. No. 824,484
[22] Filed May 14, 1969
[45] Patented June 29, 1971

[54] AUTOMATIC TRAY RELEASE ACTUATING MECHANISM FOR BALE STOOKERS
9 Claims, 5 Drawing Figs.

[52] U.S. Cl. .................................................. 214/6
[51] Int. Cl. ................................................... B65g 57/32
[50] Field of Search ........................................ 214/6 B, 6
H, 6 P, 6 K; 56/473.5

[56] References Cited
UNITED STATES PATENTS

| | | | | |
|---|---|---|---|---|
| 3,111,233 | 11/1963 | Raynor | | 214/6 (P) |
| 3,158,270 | 11/1964 | Prentice | | 214/6 (B) |
| 3,223,253 | 12/1965 | Garbe et al. | | 214/6 (B) |
| 3,246,774 | 4/1966 | Bishop | | 214/6 (B) |
| 3,260,380 | 7/1966 | Skromme et al. | | 214/6 (B) |
| 3,370,719 | 2/1968 | Oler | | 214/6 (B) |
| 3,375,940 | 4/1968 | Thompson et al. | | 214/6 (B) |
| 3,446,369 | 5/1969 | May et al. | | 214/6 (B) |

Primary Examiner—Gerald M. Forlenza
Assistant Examiner—Robert J. Spar
Attorney—Anderson, Spangler & Wymore ABSTRACT: This invention relates to an automatic mechanism for tripping the release lever of a bale stooker so as to drop the bale-receiving tray down into its bale-unloading position. The release mechanism includes an arm located in the path of the incoming bales that is raised as each passes therebeneath and functions through a dog-carrying arm pivotally attached thereto to rotate a wheel into position where a trigger turning with the latter trips the bale tray release lever into its discharge position.

INVENTOR
ROY O. MILLER

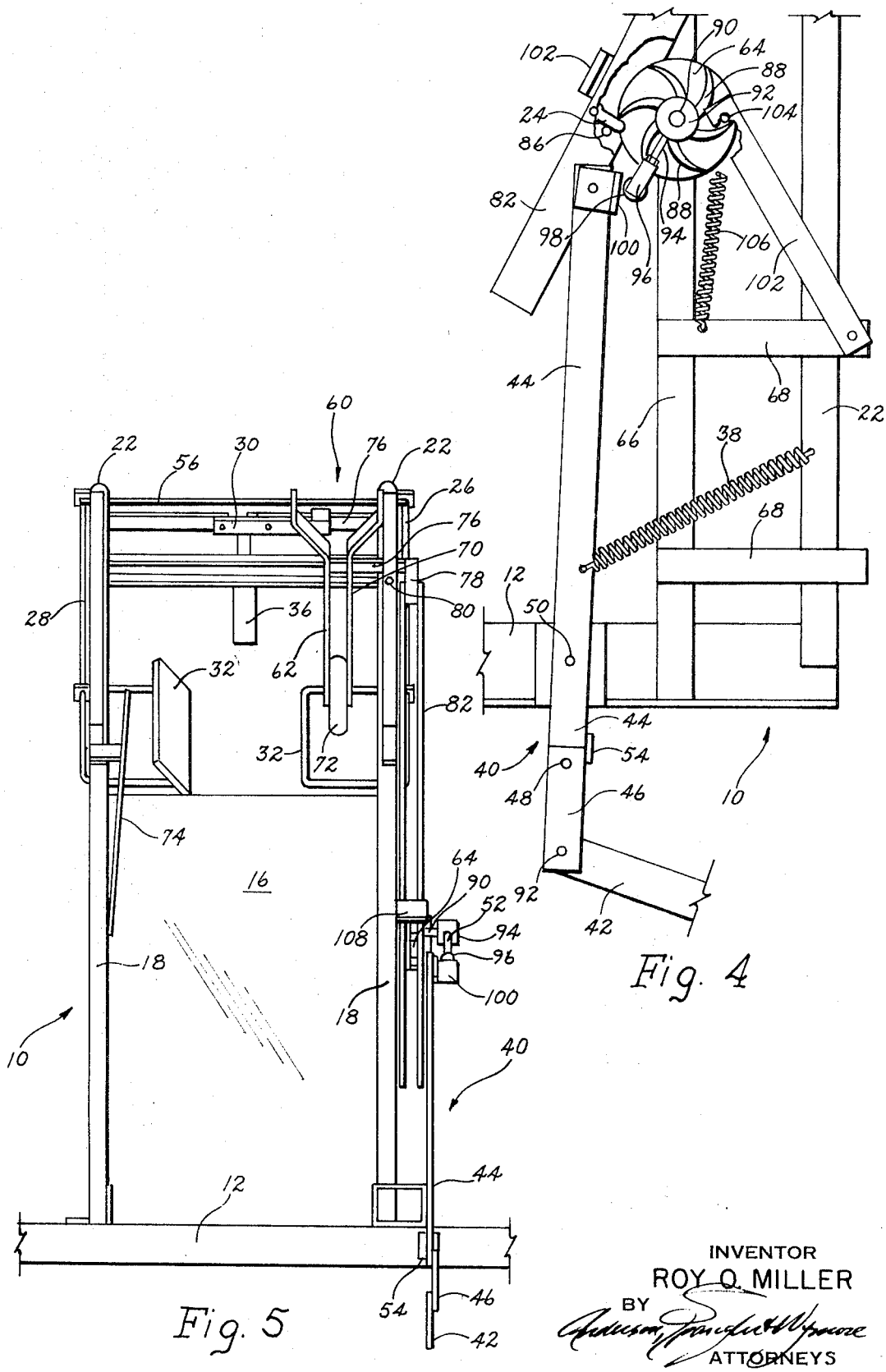

AUTOMATIC TRAY RELEASE ACTUATING MECHANISM FOR BALE STOOKERS

In U.S. Letters Pat. No. 3,158,270 issued Nov. 24, 1964, and entitled, "STOOKER FOR TRAVELING BALER," the inventor, Wilfred Prentice, discloses a unique and well-designed stooker for use with a tractor-drawn or self-propelled traveling baler as a means for receiving the bales discharged therefrom and arranging same in a pyramidal stack preparatory to setting same down in the field to cure. One by one, the bales from the baler, six in all, travel up an inclined ramp and pass over the end thereof where they drop down upon and are cradled between a pair of pivoted gates having arms extending therebeneath. As the bale following immediately therebehind strikes the bale thus cradled, it moves the latter forward against a trip lever which, upon actuation, releases the gates so that they are free to move apart. The weight of the bale supported between these gates swings them downwardly and outwardly trapdoor fashion and allows the bale to drop therebetween onto a traylike carrier that has 45° deflector plates which cause it to rest on an edge rather than one of its flat faces. As each bale passes between the gates, counterweights return them to bale-receiving position and relatch the trip lever. Each bale, in turn, drops onto the tray and assumes its proper position in the pyramidal stack by tumbling to one side or the other off of those already there. The sixth bale forms the apex of the pyramidal stack, which, therefore, can't accept any more and must be discharged.

The traylike carrier is pivotally attached to the main stooker frame well forward of the stack so that the weight of the latter tends to tilt the tray downwardly under its rear and drags on the ground. A toggle-type tray release lever, however, normally holds the tray in substantially horizontal position and a spring braces it onto this same position whenever the load is removed therefrom. A similar spring resets the toggle latch of the tray release lever once the load has been discharged.

The aforementioned patent contemplates manual actuation of the tray release lever by means of lanyard extending forwardly to the operator which he pulls upon as soon as the sixth bale is positioned atop the stack being formed on the carrier. Since the bales must, of necessity, always run ahead of the stooker and be attended by the operator, he must turn around in order to discharge the stack at the proper instant. In some instances, this may involve directing the attention rearwardly for a substantial interval while the stacking cycle is being completed. Obviously, if the operator is also responsible for driving the tractor and overseeing operation of the baler, he has little time left to be looking back to see when to trip the stooker tray.

The present invention comprises an improvement to the above-described patented mechanism by means of which the entire stack-discharging operation is taken care of automatically and at the precise instant when the sixth bale drops onto the top of the stack thus relieving the operator of this duty so that his attention can be directed elsewhere. The improvement involves only modest additions to the existing stooker and they do not interfere with the normal operation thereof in any way except for automating the stack-discharge step. The increased safety attendant to eliminating the need for the operator to turn around and observe the stacking cycle so that he can focus his attention ahead of him where it should be is, perhaps, most important of all.

Accordingly, it is the principal object of the present invention to provide a novel actuating mechanism for automatically discharging the stack from a bale stooker of the general type forming the subject matter of U.S. Pat. No. 3,158,270.

A second objective is the provision of a device of the type aforementioned which automatically counts the bales and actuates the tray release trip lever as the sixth bale passes therebeneath.

Another object of the invention herein disclosed and claimed is to provide a release mechanism that can be added to existing bale stookers without making any material alterations therein.

Still another objective is to provide a stack release for a bale stooker that operates independent of the size, weight or composition of the bale.

An additional object is to equip a bale stooker with an automatic stack-discharging mechanism that frees the operator to perform other duties such as driving the tractor and attending the baler.

Further objects of the invention forming the subject matter hereof are to provide an attachment for bale stookers that is easy to install, rugged, versatile, inexpensive, simple to repair, compact, and one that does not interfere with normal operation of the stooker.

Other objects will be in part apparent and in part pointed out specifically hereinafter in connection with the description that follows, and in which.

FIG. 4 is an enlarged fragmentary detail showing the elements of the tripping mechanism, a portion of the link having been broken away to reveal the ratchet pawl along with a similar portion of the arm carrying the stop dog that prevents reverse rotation of the ratchet wheel; and, FIG. 5 is a fragmentary front elevation showing the ramp, bale deflector, auxiliary frame, bale-sensing arm, link, and trigger mechanism.

Figure 1:
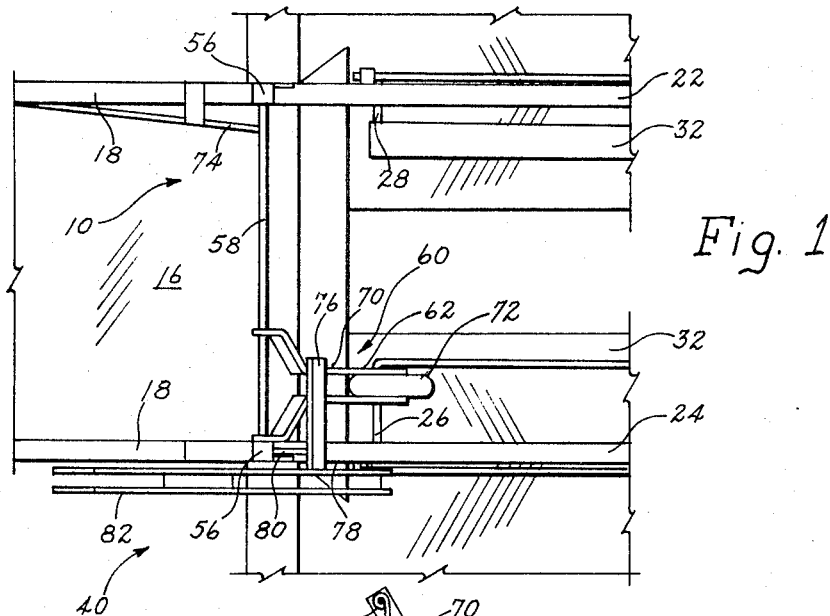
FIG. 1 is a fragmentary top plan view showing the manner in which the bale-sensing arm is pivotally mounted at the discharge end of the ramp on an overhead auxiliary frame attached to the main stooker frame.
Figure 2:
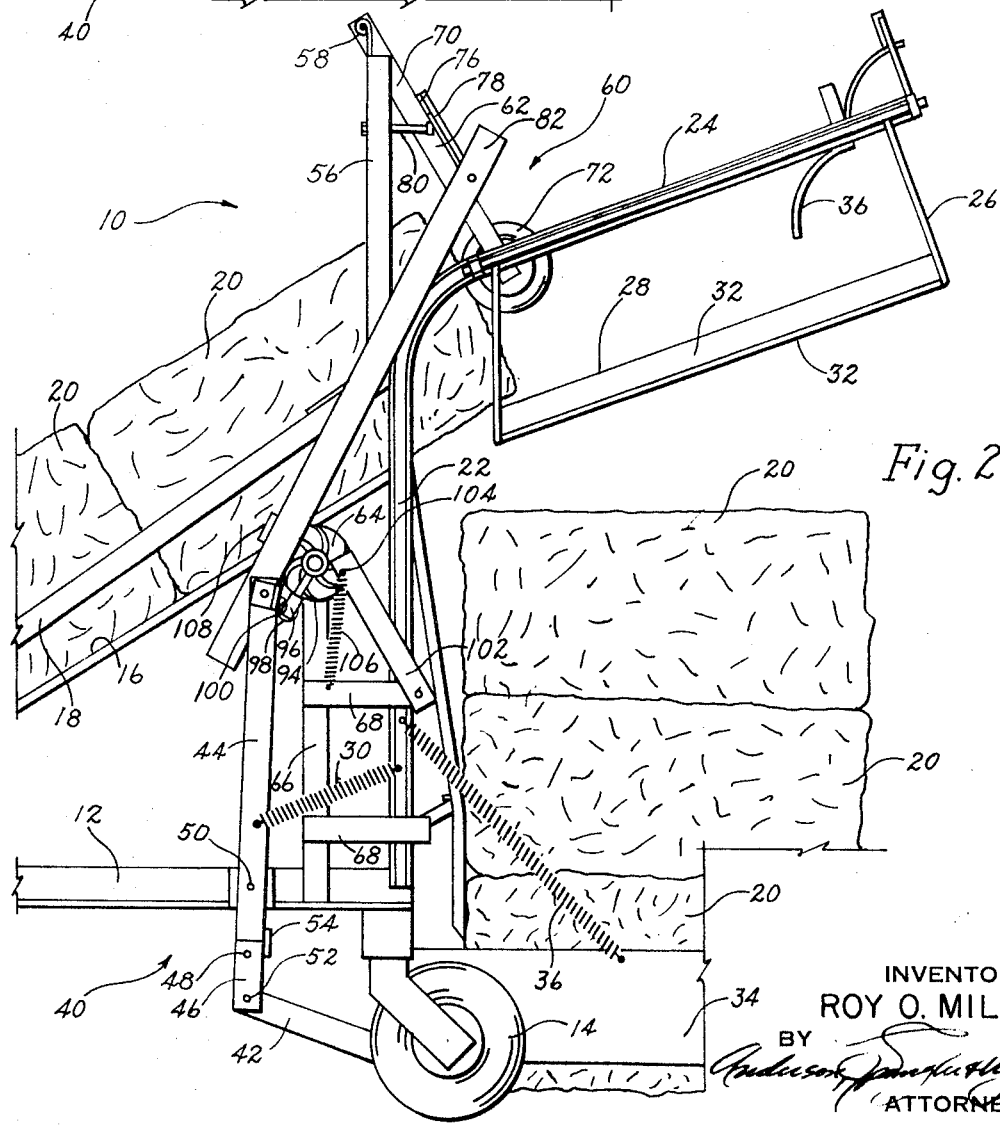
FIG. 2 is a fragmentary side elevation showing the stooker fully loaded with a six bale stack preparatory to receiving the seventh bale that will rotate the trigger into position to actuate the tray release lever.
Figure 3:
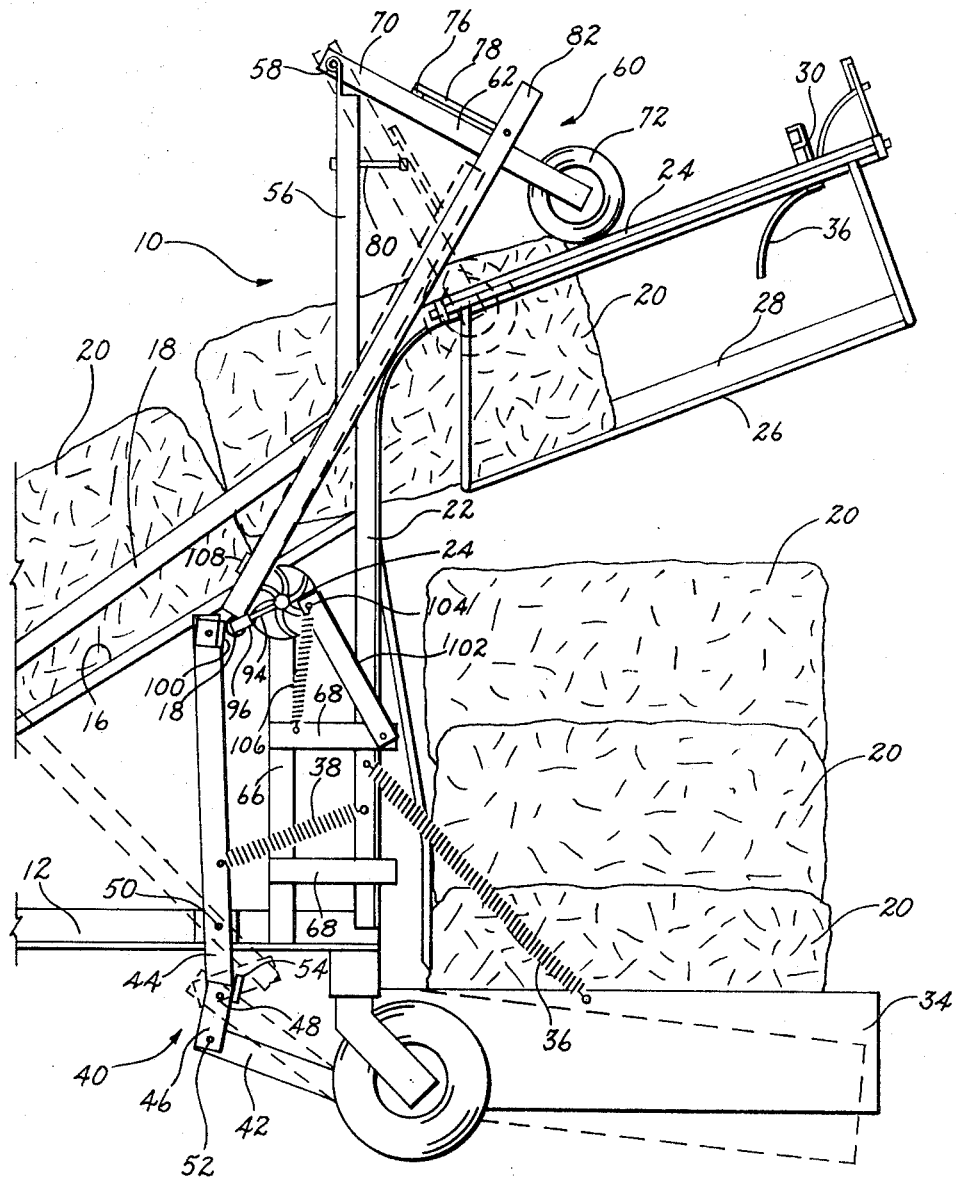
FIG. 3 is a fragmentary side elevation like FIG. 2 except that the seventh bale is shown passing beneath the bale-sensing arm and the trigger has tripped the tray-release lever.

Referring next to the drawings for a detailed description of the present invention and, initially, to FIGS. 1, 2 and 3 of the drawings, the stooker which has been broadly designated by reference numeral 10 includes a main frame 12 adapted to be drawn along the ground on caster wheels 14 mounted for swiveling movement on the rear outboard corners. This frame supports an upwardly and rearwardly inclined ramp 16 bordered by siderails 18 that confine the bales 20 therebetween and keep it on the ramp. As clearly explained in U.S. Pat. No. 3,158,270, the stooker is used in association with a traveling baler (not shown) and the bales discharged from its bale chamber are delivered to the bottom of the stooker ramp 16 and pushed one after the other up and over the discharge end thereof.

The main frame 12 has uprights 22 located at the rear end of the ramp that include rearwardly extending arms 24 that support the bale-cradling shoes 26 and 28 that will be described in detail presently along with the bale-release trigger mechanism 30. The bale 20 moving off the discharge end of the ramp 16 as shown in FIG. 2 drops on to the shoes 26 and 28 as clearly revealed in FIG. 3. These shoes are pivotally mounted beneath the rearwardly extending arms 24 of the uprights and each has a laterally-offset portion 32 that extends beneath the bale in supporting relation thereto. These shoes are operatively associated with the bale-release trigger mechanism 30 so that they spread apart and drop the bale onto the bale tray 34 or other bales previously stacked thereon when the cradled bale is pushed against the trigger 36 as clearly explained in the aforementioned patent. Since this bale release mechanism is constructed and operates exactly as set forth therein and forms no part of the instant invention, no useful purpose would be served by redescribing it in detail. It should suffice to point out that the bales drop down one at a time onto the tray 34 where they are supported on edge in V-shaped troughs (not shown) that hold three on the bottom row, two in the middle row within the V-shaped grooves defined by the bottom three, and one on the top in the single V-shaped groove between the middle two so as to make a six bale pyramidal stack.

Tray 34 is hingedly attached at its forward end to the main stooker frame 12 between the caster wheels 14. Tension springs 36 connected to the tray behind its front pivoted end and the uprights 22 of the main frame are sufficiently strong to raise it up off the ground onto the full line latched position of FIGS. 2 and 3 when it is carrying no load; however, the weight of one or more bales up to a full six bale stack thereof is such as to overcome the spring bias exerted thereby and permit the tray to drop down into the broken-line stack discharge position of FIG. 3 whenever unlatched. Another tension spring 38 relatches the latch mechanism which has been indicated in a general way by numeral 40 whenever the load is discharged onto the ground off the rear end of the tray.

Now, while this tray release latch mechanism 40 is, once again, fully described in U.S. Pat. No. 3,158,270, a brief description thereof will prove helpful in understanding how the automatic actuating mechanism of the instant invention operates thereon. Extending forwardly from tray 34 to a position well ahead of its pivot is an arm 42. A tray release lever 44 is pivotally attached to the main stooker frame 12 with its lower extremity projecting therebeneath where it is pivotally connected to arm 42 by toggle-type link 46. Spring 38, previously mentioned, is connected between upright 22 of the main frame 12 and release lever 44 above its pivot. The normal or "latched" position of the tray-release subassembly 40 is that shown in FIGS. 2 and 4 where the middle pivot point 48 is slightly overcenter or ahead of the straight line defined by pivot points 50 and 52. A stop such as that shown at 54 on the rear edge of the toggle link engages the back edge of the release lever and prevents the toggle connection from collapsing forwardly.

In the original stooker design shown in the patent already mentioned, the tray-release latch mechanism was actuated manually by the operator who sat ahead of the stooker and pulled upon a lanyard (not shown) connected to the upper end of the release lever so as to pull it forwardly into the broken line position of FIG. 3. Actually, as soon as the center pivot 48 moved rearwardly back across center (full lines in FIG. 3) the toggle link collapsed and the rear end of the tray dropped down thus depositing the stack on the ground. Once the load was off the tray, spring 36 raised it back up into its full-line load-receiving position where the other spring 38 has returned the release lever to the full line position of FIGS. 2 and 4 resetting the toggle and latching the tray up.

Up to this point, the entire mechanism described is essentially that found in the aforementioned U.S. prior art patent. The present invention does not alter this operation, but instead, provides an automatic bale-actuated mechanism for tripping release lever 44 in place of the lanyard used before. An auxiliary frame consisting of a pair of uprights 56 is fastened to the siderails 18 near the discharge end of the ramp and interconnected across the top by a horizontal rod 58, that cooperates with said uprights to define an arch over the top of the bales.

The automatic actuating mechanism has been indicated in a general way by reference numeral 60 and the bale-sensing portion 62 thereof is pivotally suspended from rod 58 while the trigger-carrying ratchet wheel 64 is mounted for rotation on a subframe consisting of an upright member 66 paralleling upright 22 and a pair of crossbraces 68. The bale-sensing portion 62 comprises, in the particular form shown, a generally Y-shaped yoke 70, the divergent upper end portions of which are pivotally mounted on rod 58 while a wheel 72 is journaled for rotation between the parallel legs of its stem portion. As illustrated, the wheel 72 and its pivoted supporting structure are displaced to one side of the centerline of the ramp while a deflector 74 depending from the opposite siderail 18 of the main stooker frame 12 near the discharge end thereof diverts the bales so as to insure their passing beneath the bale-sensing mechanism.

Extending out laterally from the wheel-carrying yoke 70 is an L-shaped bracket 76, the right angle leg 78 of which lies in the same plane as one of the uprights 56 of the auxiliary frame.

An adjustable stop 80 is carried by upright 56 of the auxiliary frame and the right-angle leg 78 of the L-shaped bracket impinges thereagainst to limit the distance the bale-sensing mechanism can swing down under rod 58 to approximately shown by broken lines in FIG. 3. This broken line position is the bale-receiving position and is directly in the path of a bale leaving the discharge end of the ramp and entering the bale-carrying cradle. The wheel 72 rides up over the front end of the bale and, in so doing, raises ratchet wheel actuating arm 82 which is pivotally connected to the free end of the right angle leg 78 of L-shaped bracket 76.

Next, referring to FIGS. 4 and 5, it will be seen that arm 82 has spaced parallel elements defining a channel within which is pivotally mounted a ratchet pawl 84 and a pin stop 86 for the latter. The forward edge of the ratchet wheel 64 extends well into the aforementioned channel in position such that the curved vane-like teeth 88 thereof are engaged by the pawl 84 moving against the underside thereof as the arm 82 raises in response to the bale-sensing mechanism 62 riding up over the end of a bale. As each tooth, in turn, is engaged and lifted by the pawl, the ratchet wheel is rotated approximately one-sixth revolution or about 30°. While lifting the tooth, the pawl 84 is resting atop its pin stop 86; however, as the arm 82 completes its cycle and drops back down to the broken line position of FIG. 3 (full lines in FIGS. 1 and 2) following removal of a bale from the cradle, the pawl is lifted as it passes down over the following tooth 88 before dropping into position therebehind preparatory to lifting it as the next bale moves into the cradle.

The ratchet wheel is mounted on a shaft 90 that is, in turn, journaled for rotation with a suitable bearing (not shown) carried by upright 66 of the subframe. Also mounted on shaft 90 for rotation therewith is the trigger subassembly comprising a sleeve 92 having a rod 94 projecting radially therefrom that carries a clevis 96 on its outer free end journaling a roller 98. As the ratchet wheel rotates, roller 98 of the trigger subassembly strikes kicker-plate 100 carried on the upper end of the release lever and moves it forward from the "latched" position of FIG. 2 to the "released" position shown in full lines in FIG. 3 where pivot point 48 has just barely moved rearwardly over center allowing the toggle connection to "collapse" into the broken line position of FIG. 3 under the weight of the stack on the platform or tray 34. The trigger mechanism, of course, acts in opposition to the bias exerted on the release lever by spring 38 and is easily sufficient to overcome same. Actually, the trigger mechanism need only move the release lever about a half inch in order to trip the toggle connection.

On the opposite side of the ratchet wheel 64 from where pawl 84 engages same, an antireversing mechanism is provided to keep the wheel from turning backward or counterclockwise as viewed in FIGS. 2, 3 and 4. This antireverse mechanism comprises an arm 102 pivotally attached to the uppercross member 68 of the subframe in the particular form shown that carries a stop pin 104 which moves to position atop each tooth 88 as the wheel rotates by reason of the bias exerted upon said arm by tension spring 106. The curvature of the teeth 88 is such as to "cam" pin 104 out of the way and swing arm 102 to the right or clockwise in FIGS. 2, 3 and 4 as it moves therepast. As soon as pin 104 passes over the end of the tooth, of course, spring 106 pulls the arm back to the left and locks the pin in on top thereof thus preventing counterclockwise rotation of the wheel.

About the only remaining feature that requires specific mention is an L-shaped stop 108 carried by the frame that keeps arm 82 in position such that its pawl 84 cannot miss engaging a tooth 88. While arm 82 will normally swing down so as to leave pawl 84 resting against the ratchet wheel as shown in FIGS. 2, 3 and 4, it is possible for the arm to swing away from the wheel when bouncing over rough terrain. If this should occur when the pawl is moving up to engage a tooth of the ratchet wheel, it might pass in front thereof and fail to turn the wheel the required one-sixth revolution. Accordingly, stop 108 holds arm 82 sufficiently close to the ratchet wheel that pawl 84 cannot miss engaging a tooth.

Finally, turning our attention, once again, to FIGS. 2 and 3, it will be seen that it is the first bale of the next stack that unloads the completed six bale stack resting atop the platform. In FIG. 2, as the bale moving over the discharge end of the ramp into the cradle strikes the bale-sensing mechanism 62, it triggers the release mechanism and moves the trigger slightly past the full line position of FIG. 3. This, of course, discharges the stack onto the ground. The triggering bale is now in the cradle and will drop down onto the relatched platform as the first bale of the next stack as soon as it trips the bale-release mechanism 36. With one bale already in place, five more actuations of the ratchet wheel will complete the stack and put the trigger 98 in the position shown in FIGS. 2 and 4 ready to, once again, actuate the release lever.

I claim:

1. In a bale stooker of the type having a wheel-supported frame, a platform hingedly attached to the frame for movement between a bale-stacking position and a stack-discharging position, openable bale-receiving jaws located above the platform adapted upon actuation to drop bales supported therebetween one-at-a-time into a stook, jaw-actuating means adjacent the rearward ends of said jaws and responsive to the movement of a bale into said jaws operative to open the latter, an inclined ramp positioned and adapted to receive a continuous succession of externally pushed bales in end-to-end abutting relation and discharge same one-at-a-time onto said jaws, platform latch means connected to the platform adapted to maintain same in bale-receiving position until actuated, platform latch release means including a release lever connected to the platform latch means operative upon actuation to actuate the latter and release the platform into stack-discharging position, and platform latch reset means connected to the platform operative when the latter is unloaded to return same to its bale-stacking position and to relatch the platform latching means, the improved means for automatically actuating the release lever of the platform latch release means which comprises: bale-sensing means located above and adjacent the forward ends of the bale-receiving jaws in the path of a bale moving into position thereon; rotating trigger means journaled for rotation adjacent the release lever of the platform latch release means operative to actuate same once during each complete revolution thereof; said bale-sensing means being displaced laterally toward one side of the bale-receiving jaws, deflector means positioned on the opposite side of the ramp adapted to deflect a bale ascending the latter toward said laterally offset bale-sensing means; and, link means interconnecting the bale-sensing means and the rotating trigger means, said link means being operative upon each response of the bale-sensing means to a bale impinging thereagainst to turn said trigger means through an arc of approximately $360/n$ degrees where "n" is the number of bales in a complete stook thereof on the platform, said link means being operative upon movement of "n" bales past the bale-sensing means to rotate said trigger through one complete revolution, and said link means and bale-sensing means cooperating with one another and with the jaw-actuating means upon actuation of the latter by a bale to index said trigger means $1/n$th revolution in response to the discharge of said same bale onto the platform.

2. The improvement as set forth in claim 1 in which: the rotating trigger means comprises ratchet wheel means having "n" teeth rotatable in a plane lying in spaced substantially parallel relation alongside the release lever, and a trigger arm mounted for rotational movement with said ratchet wheel means through a circular arc coplanar with the plane in which said release lever moves; and, means comprising a ratchet pawl is carried by the link means in position to engage the ratchet wheel means, said pawl being operative to engage successive teeth of said ratchet wheel means and turn same in one direction through $1/n$th revolution during each actuation of the bale-sensing means.

3. The improvement as set forth in claim 1 in which: the bale-sensing means comprises an arm pivotally attached for hinged movement about a transverse axis above the discharge end of the ramp through an arc extending in the direction of bale movement up the latter.

4. The improvement as set forth in claim 1 in which: stop means are located in engagement with the rotating trigger means operative to prevent reverse rotation thereof.

5. The improvement as set forth in claim 2 in which: stop means are located to engage the link means and prevent the ratchet pawl carried thereby from missing the teeth of the ratchet wheel means.

6. The improvement as set forth in claim 2 in which: stop means are located to engage the teeth of the ratchet wheel means and prevent reverse rotation thereof while the ratchet pawl is disengaged therefrom.

7. The improvement as set forth in claim 3 in which: a wheel is journaled for rotation on the free end of the hinged arm about an axis lying in spaced substantially parallel relation beneath the axis of pivotal movement thereof.

8. The improvement as set forth in claim 3 in which: stop means are located to contact the hinged arm and limit the travel thereof in the direction opposite that in which the bales are moving up the ramp.

9. The improvement as set forth in claim 6 in which: the stop means comprises a pivoted lever carrying a tooth-engaging stop spring-biased into engagement with the teeth of the ratchet wheel means.